Patented Jan. 10, 1939

2,143,639

UNITED STATES PATENT OFFICE 2,143,639

ARTICLE OF CELLULOSE

Amerigo F. Caprio, Newark, N. J., assignor to Celluloid Corporation, a corporation of New Jersey No Drawing. Application September 24, 1936, Serial No. 102,301

4 Claims. (Cl. 21—43)

This invention relates to the treatment of articles of cellulose, such as poles, flooring, railroad ties, piles, piers, etc., to preserve same against termites, ants, and other insects and against decay and mold growths. The invention relates more particularly to the impregnating or coating of articles of cellulose with alkyl, aryl or alkyl-aryl phosphates or phosphites, especially those phosphates that are not soluble in water and that have toxic properties, an outstanding example of which is tri ortho cresyl phosphate.

An object of this invention is the economic and expeditious treatment of articles of wood, fabric or other cellulosic material to preserve the same against attack by insects, bacteria, dry rot and fungi. Another object of the invention is the production of a termite-proof wood which is natural in color and free of any odor due to the presence of a preservative. A still further object of the invention is the production of a termite-proof wood which does not lose its effectiveness with age and exposure. Still another object of the invention is the production of a termite-proof wood which may be coated with paint, lacquer and the like. Other objects of the invention will appear from the following detailed description.

This invention, although it is applicable to many types of insect control, is especially applicable to termite control and prevention by the use of organic phosphates and phosphites, particularly the toxic esters such as ortho cresyl phosphate. The yearly damage done by termites in the United States is estimated to be about fifty million dollars. As an effective means of combating this great waste I have found that wood or cellulose fibre impregnated with alkyl, aryl, alkyl-aryl phosphates, phosphites, thiophosphates, thio-phosphites, or mixtures containing same, are not attacked by termites, mold, decay, etc. Wood may be impregnated with the organic phosphates or phosphites, etc., by the cylinder pressure method or the open tank dipping system. The cylinder pressure method, of course, insures a more thorough impregnation or saturation. Where the timber is already placed in a building beneficial effects may be obtained by brushing or spraying the same with organic phosphates or solutions and/or emulsions of same either cold or hot. This invention is applicable to termites or "white ants" belonging to any genera, the more common ones belonging to the genera Reticulitermes, Heterotermes, Amitermes, etc. of subterranean and wood boring habits and Termopsis, Kalotermes, Neotermes, Cryptotermes, etc. of non-subterranean living tree boring habits. There are over fifty species of such termites in the United States. However, besides termites, the invention is also found effective against other insects, such as bees, ants, wasps, beetles, roaches, aphids, flies, mosquitoes, moths and other pests.

In addition to the impregnation of timber, this invention is also applicable to the treatment of concrete, brick, tile, etc. which when treated are not only made insect-proof but also waterproof. I have also found that the organic phosphate, phosphite and thio-phosphate and phosphite esters may effectively be used as "soil-poisons" to be placed about the foundation of buildings.

A major advantage of employing this invention over creosoted wood is that no offensive odor is produced in buildings constructed at least in part of the treated wood. Furthermore, there is no material change in color between the wood before and after treatment in accordance with this invention. In this connection, it may be stated that wood treated in accordance with this invention may be stained or coated with paint, lacquer and the like, which treatment cannot be given to wood treated with creosote, kerosene, Paris green and other insect-proofing substances. Wooden articles treated by impregnating same with an organic ester of phosphorus may be painted, enameled and/or otherwise coated for color effect and surface protection as the organic ester of phosphorus, if anything, increases the susceptibility of the wood to take and retain such coatings. It may also be stated that although the organic esters of phosphorus are exceptionally good insecticides they are not injurious to humans when the contact is external.

A still further advantage of this invention over prior methods is that the treated material is less combustible after treatment than before treatment, and in some cases the treated material is substantially fire-proof after treatment. The treated material is also resistant to water and moisture and is substantially free from attack by salts such as those contained in sea water.

In accordance with my invention, I coat or impregnate cellulosic materials with an insect-proofing compound comprising a trialkyl, aryl or alkyl-aryl ester of a phosphoric acid to render the same preserved against attack by termites (white ants), beetles, aphids, etc., and preserved against fast decay caused by bacteria, and fungi, such as dry rot, mold, etc. The treated cellulosic material is also rendered less flammable and more resistant to attack by salt water, atmosphere and earth. The insect-proofing compound may also contain besides the organic ester of phosphoric acid any of the common and well known insecticides, fungicides, germicides, such as zinc chloride, camphor, Paris green, lead arsenate, pyrethrum, calcium cyanide and like materials.

Although the treating substance preferably contains tri ortho cresyl phosphate, the same may be replaced in whole or in any part with any suitable alkyl, aryl or alkyl-aryl ester of phosphorus. By the term "organic ester of phosphorus", used in the specification and claims, is meant any aryl, alkyl or alkyl-aryl ester of phosphoric acid and phosphorus acid. The term is meant to include also the thio-phosphates and thio phosphites. In the case of thio phosphates the sulphur atoms may be in different places. For example, there may be tricresyl thio phosphate $(CH_3C_6H_4O)_3PS$ or tri thio cresyl phosphate $(CH_3C_6H_4S)_3PO$. As stated above, it is preferable to use the more or less toxic phosphates which are water-insoluble, as these have a higher efficiency and do not leach out in the presence of moisture. Thus, broadly, any of the organic esters of the phosphoric acids may be employed and especially those that are non-volatile at normal temperatures, water insoluble and chemically stable or inactive. Examples of the phosphoric esters that are applicable are the homogeneous aryl phosphoric acid ester as

where R refers to any radical of any one of the phenols; the mixed aryl phosphoric acid esters of

where R1, R2 and R3 represent at least two different radicals of the phenols; the homogeneous alkyl phosphoric acid esters as

where R4 represents any alkyl radical; the mixed alkyl esters of phosphoric acid as

where R5, R6 and R7 represent at least two different radicals of hydroxy aliphatic compounds; and the mixed alkyl-aryl esters of phosphoric acid as

where R8, R9 and R10 are either aryl radicals and/or radicals of hydroxy aliphatic compounds, such as butyl alcohol, ether glycols and polyglycols, etc.

Examples of some of phosphoric acid esters are tributyl phosphate, triethoxyethyl phosphate, triamyl phosphate, tribetachlorethyl phosphate, triphenyl phosphate, dibutyl phenyl phosphate, monomethyl diphenyl phosphate, tricresyl phosphate (all isomers and chemical mixtures of the same as more fully described in U. S. applications S. Nos. 706,360 filed January 12, 1934, 718,436 filed March 31, 1934 and S. No. 720,448 filed April 13, 1934), monocresyl-diphenyl phosphate, trixylenyl phosphate, trinaphthyl phosphate, tribenzyl phosphate, tri-orthodiphenyl phosphate, phosphate esters of glycol ethers and the corresponding thio phosphates of some of the above compounds. Under the broad term of organic esters of phosphorus may be included the phosphites and thio phosphates and phosphites corresponding to the above examples.

The treating composition or substance may be formed entirely of a single organic ester of phosphorus, a mixture of organic esters of phosphorus or either a single or mixture of organic esters of phosphorus mixed with other insecticides. It may be desired to impregnate the cellulosic material with a composition containing an organic ester of phosphoric acid which is solid at normal temperatures, such as triphenyl phosphate, which may be accomplished by treating the wood in the composition heated to a sufficient temperature to melt the organic ester or by dissolving the organic ester in a volatile or semi-volatile solvent. Aqueous emulsions of the above organic esters of phosphorus and other insecticides may also be satisfactorily employed. The organic ester of phosphorus may also be dissolved in solvents or other volatile toxic liquids, such as alcohol, ethylene dichloride, carbon tetrachloride, furfural, carbon bisulphide, beta dichlor diethyl ether, to render the penetration into the timber, wood, fibres, etc., more rapid and complete.

Cellulosic articles, such as wood, cloth, pressed fibre, etc., may be treated with the treating substance in any suitable manner. When small, thin, light or porous wood is employed, such as found in laths, the mere dipping of the same in the liquid treating substance is found to be sufficient. In treating large poles, railroad ties, floor studdings and the like construction materials, the wood may first have a vacuum applied thereto and then the treating liquid forced into the wood under pressure by means of any pressure tank methods commonly employed in impregnating wood. In certain cases the wood may be soaked in cold or hot treating baths by means of open or closed tank methods also well known in the art of impregnating wood. The esters of phosphorus may be dissolved in volatile solvents for spraying or atomizing to destroy flies, etc. In this connection, mosquito wire screen or cloth may be sprayed with an ester of phosphorus dissolved in kerosene. The kerosene evaporates leaving a residual film of the insecticide.

Other materials may be incorporated in the treating compound or substance. These materials may be, for example, coal tar creosote and crude liquid ortho dichlor benzene, both of which are soluble in the tricresyl phosphates. Para dichlorbenzene in the crystalline form may also be used as well as chlorinated naphthalene, such as the "halowaxes". Zinc chloride dissolved in water may also be used with organic ester of phosphorus aqueous emulsions for impregnating wood or soil poisoning purposes. It has been found that the organic ester of phosphorus as a vehicle will render the above chemicals more effective as it prevents rapid evaporation, reduces the fire hazard and is itself an insecticide. Oils of citranella, geranium, mineral oils, etc., may also be added to the organic ester of phosphorus. A standard mixture for termite extermination may consist of 85 parts kerosene or mineral spirits, 12 parts ortho dichlorbenzene and 50 parts triortho cresyl phosphate. This composition is very effective as an insecticide and termite exterminator or resistor, yet it does not render the treated material more flammable. An equal amount of organic ester of phosphoric acid may be mixed with an emulsion of kerosene and nicotine oleate. Besides the volatile liquids, some of which have been named above, I may use solid poisons dissolved in the organic ester or suspended in the organic ester emulsion. These solids, besides those named above, may be Paris green, Rotinone, betanaphthol, naphthalene, sodium fluo silicate, sodium fluoride, etc.

Termites, beetles, etc. may cause injury to living trees, shrubs, nursery stock and grape vines. When employing the organic ester of phosphoric acid as a soil poison, it does not only exterminate the insect but the organic ester itself has fertilizing value owing to the phosphate content. The organic ester of phosphoric acid or compounds containing the same may be used as soil poisons in the usual manner. These compositions may also be painted on the trunks of trees and shrubs to prevent insects, such as caterpillars, from creeping up to the branches and to prevent moths from laying their eggs in the bark. Resinous substances may be added, if desired, to make the preparation more tacky. A tacky mixture or solution of rosin in tricresyl phosphate or similar ester, with or without other agents, makes an effective fly paper or ribbon.

Sweetening agents which are eaten by the insects and which will serve as a bait, such as glycerine, glycol, sugar or other compounds, may be dissolved or suspended in the organic ester of phosphorus. I have found that glycerine is of especial value in this respect when it is desired to exterminate the insects themselves rather than to prevent their destructive attack.

As illustrations and not as limitations the following examples are given:

Example I

A building material impregnated with a composition comprising tricresyl phosphate, at least 5% of which is tri ortho cresyl phosphate.

Example II

A soil poison comprising a mixture of 100 parts tricresyl phosphate, 10 parts nicotine oleate and 10 parts Paris green.

Example III

A cellulosic material, such as wood, impregnated with or coated with a substance containing 100 parts tricresyl phosphate and 50 parts ortho dichlorbenzene.

It is to be understood that the foregoing detailed description is given merely by way of illustration and that many variations may be made therein without departing from the spirit of my invention.

Having described my invention, what I desire to secure by Letters Patent is:

1. Method of protecting wood against termites, which comprises treating the wood with a medium comprising tricresyl phosphate, which medium is free from lacquer bases, in amount and under such conditions as to render the wood termite-proof.

2. Method of protecting wood against termites, which comprises treating the wood with a medium comprising tri ortho cresyl phosphate, which medium is free from lacquer bases, in amount and under such conditions as to render the wood termite-proof.

3. Method of protecting the woodwork of buildings or other structures against termites, which comprises treating at least that portion of the woodwork which contacts the ground with a medium comprising tricresyl phosphate, which medium is free from lacquer bases, in amount and under such conditions as to render the wood termite-proof.

4. Method of protecting the woodwork of buildings or other structures against termites, which comprises treating at least that portion of the woodwork which contacts the ground with a medium comprising tri ortho cresyl phosphate, which medium is free from lacquer bases, in amount and under such conditions as to render the wood termite-proof.

AMERIGO F. CAPRIO.